United States Patent [19]

Röhm

[11] Patent Number: 4,669,741
[45] Date of Patent: Jun. 2, 1987

[54] POWER-OPERATED JAW CHUCK FOR ECCENTRICALLY SUPPORTING WORKPIECES IN A MACHINE TOOL

[76] Inventor: Günter H. Röhm, Heinrich-Röhm-Str. 50, 7927 Sontheim, Fed. Rep. of Germany

[21] Appl. No.: 811,101

[22] Filed: Dec. 19, 1985

[30] Foreign Application Priority Data

Dec. 21, 1984 [DE] Fed. Rep. of Germany ....... 3446687

[51] Int. Cl.[4] .......................... B23B 5/22; B23B 31/14
[52] U.S. Cl. .................................. 279/1 C; 82/40 A; 82/DIG. 6; 279/6; 279/121
[58] Field of Search ..................... 279/1 C, 1 J, 6, 121; 82/9, 40 A, DIG. 6

[56] References Cited

U.S. PATENT DOCUMENTS

| 1,817,721 | 8/1931 | Van Hamersveld | 279/6 |
| 3,814,451 | 6/1974 | Röhm | 279/121 |
| 4,521,028 | 6/1985 | Hiestand | 279/1 C |

FOREIGN PATENT DOCUMENTS

| 570215 | 2/1959 | Canada | 82/40 A |
| 71011 | 4/1983 | Japan | 82/40 A |

*Primary Examiner*—Gil Weidenfeld
*Assistant Examiner*—Steven C. Bishop
*Attorney, Agent, or Firm*—Karl F. Ross; Herbert Dubno

[57] ABSTRACT

The power chuck is particularly intended for holding crankshafts. The chuck has a base, a head, and clamping jaws. The head is radially guided with respect to a clamping axis which extends parallel to an axis of rotation. The clamping jaws are connected to a drive piston by way of axially movable wedge members which can be axially displaced in the base. The chuck also has a holding body which is reciprocatingly guided at the base. When considered in transverse direction with respect to its direction of displacement, the holding body has a width which is smaller than the diameter of the base. Parallel thereto and on both sides of the holding body are arranged movably guided counterbalancing elements, and they are each connected by way of a gear wheel in a countercurrent manner to the body. Several clamping jaws are separated into an inner part and an outer part, of which the inner part is guided in the holding body, and the outer part with the wedge member connected to it is guided in the base. Both parts are operatively connected by way of a dovetail slide connection which extends parallel to the direction of displacement of the holding body.

13 Claims, 9 Drawing Figures

POWER-OPERATED JAW CHUCK FOR ECCENTRICALLY SUPPORTING WORKPIECES IN A MACHINE TOOL

FIELD OF THE INVENTION

My present invention relates to a power chuck and, more particularly, to a power-operated jaw chuck for workpieces which must be clamped eccentrically with respect to a spindle axis, e.g. automotive crankshafts.

BACKGROUND OF THE INVENTION

A conventional power-operated jaw chuck can have a base for mounting it during use upon the operational spindle of a lathe headstock, or a like machine tool. The base then is substantially coaxial with respect to the spindle about the axis of which it is rotated.

The clamping jaws of the chuck are radially guided in a chucking head on this base, so as to be movable toward and away from a clamping axis which is parallel to the axis of rotation but can be offset therefrom for eccentric chucking. Axially movable wedge members serve to connect the clamping jaws to a drive piston.

The chuck also has a holding body which is adjustably guided at the base, i.e., in a direction transverse to the axis of rotation, and also in a direction parallel to a plane through the axis of rotation and the clamping axis.

The assembly further includes counterbalancing elements which can move in the same direction as the holding body.

This chuck makes it possible to turn crankshafts and other eccentric workpieces on a lathe with a fairly constant chucking diameter, but with varying crank or crank-stroke distances. However, adaptation to other chucking diameters or distances is only possible through replacement of mounting elements which are mounted on the chuck jaws or jaws mounted on movable jaw carriers.

In general terms, the chuck base is a flanged element which allows coupling of the unit to the spindle of the respective lathe, and the head is guided by corresponding means so as to be movable with respect to the base. The head could also be secured in place or clamped against the base, by means of a control spindle and a shim, or similar element, which controls its position.

The clamping jaws and their wedge elements are guided in the head, with the wedge elements being connected to the drive piston. The clamping plate serves to connect the wedge elements and the drive piston. These wedge elements are positively connected in an axial direction, but they may be shifted in the displacement or shifting direction of the chuck head.

In addition, workpiece retainers were arranged in the head, and these retainers align the workpiece prior to its clamping. For this, each retainer has a pair of guide or orienting jaws which also serve to guide the movable jaw at the chuck head.

A separate and axially movable wedge element is provided for actuation of this guide jaw. The separate wedge element, in a manner analogous to that of the wedge elements for the clamping jaws, is hung on a second clamping plate. The second clamping plate is connected to a second drive piston which exclusively serves to move the guide jaw. This second drive piston is guided in the base and it is adapted to extend coaxially with respect to the clamping piston for the clamping jaws, and coaxially with respect to the axis of rotation of the base.

In the final analysis, the chuck head, excepting the clamping plates and the drive pistons, form a full chuck assembly or unit which, in conformity with the crank distance of the workpiece, can be adjusted at the chuck base.

The counterbalancing weights are arranged at the head so as to be movable. They serve to compensate for the imbalances arising at the base upon displacements or shifting of the head. Accordingly, they can be displaced in an opposing or counter-directed manner at the head in conformity with the position in and in relation to the head. The counterbalancing weights can be clamped against the head in their respective positions by way of an associated spindle and spacers or shims.

These known chucks have the drawback that the mass of the adjustable chuck head is rather large and the mass of the attendant counterbalancing weights needs to be proportionally large. Remaining imbalances—to be absorbed by the bearings for the lathe spindle or spindles—are still relatively large, and this stresses the spindle bearings correspondingly.

Furthermore, the adjustment of the head and the counterbalancing weights is cumbersome and difficult because these associated adjustments require separate operational steps. Also, after each adjustment there is need for separate tightening or clamping for fixing the adjustment position, and this additional effort oftentimes is not without adverse affect on the accuracy of the adjustment itself.

OBJECTS OF THE INVENTION

It is accordingly an object of my invention to provide a chuck of the aforedescribed type in which the mass of the entire unit, that of the head, and that of the counterbalancing weights can be held to a minimum.

It is further an object of the present invention to provide a chuck in which residual imbalances are held to a minimum.

It is also an object of the invention to provide a chuck wherein adjustment of the head and of the counterbalancing weights is easily, simply and accurately effected.

It is yet another object of the invention to provide a chuck which is of compact design.

It is still another object of the invention to provide a chuck in which adjustment of the counterbalancing weights can be carried out substantially automatically.

SUMMARY OF THE INVENTION

These objects are attained in accordance with the invention by providing the jaw-holding body as a slide having a width—considered in the direction transverse to its direction of displacement—which is less than the diameter of the base. The respective counterbalancing elements, or weights, are arranged and guided at the base and on both sides of the holding body. These counterbalancing weights are each connected to the holding body by way of a transmission to move in a countercurrent or opposing manner.

The clamping jaws can be moved in a displacement direction which is inclined to the holding body. They are subdivided into an inner part and an outer part. Each inner part is guided in the holding body, while the corresponding outer part and the wedge member connected to it are guided in the base. Both parts are operatively connected to one another by way of a linear guide means which is providing a positive connection through an undercut, or back-taper or dovetail slide connection, or similar formation. This guiding and connecting means extends parallel to the direction of displacement of the holding body.

In the chuck apparatus according to this invention, the outer jaw parts and their associated wedge members do not form part of the chuck head, and they do not participate in the movement thereof. This also means that they do not contribute to the creation of imbalances in the system.

The outer and inner jaw parts are connected to the head and with respect to one another in the linear connecting and guide means, for example, a dovetail guide or T-shaped tongue and groove guide, and they can be displaced in the guide means. On the other hand, when considered in the adjustment directions of the clamping jaws, the outer and inner parts are positively coupled to one another. Accordingly, the inner jaw parts participate in the adjustment movement of the associated outer jaw parts, but independently of the adjustment or position of the head at the base.

This arrangement and guiding of the outer jaw parts at the base allows the holding body of the chuck head, which body serves to carry the inner jaw parts, to be rather narrow and of reduced mass. This means that the counterbalancing weights are correspondingly reduced in mass and can be placed alongside the holding body, and they can be arranged and guided on the base.

In summary, overall advantageously compact assemblies are achieved with space-saving qualities and with reduced mass. This is furthermore achieved by the respective transmission of motive power between the head and the counterbalancing weights, and the latter are adjusted in independent manner during adjustment, or movement, of the head, and thereby effect compensation of imbalances in substantially automatic manner.

Advantageously when one of the jaws is guided in the same direction as the holding body, this clamping jaw is formed as a unitary component, i.e., it is not subdivided into inner and outer parts. The unitary part and its associated wedge member are guided only in the holding body. This associated wedge member is axially supported and disposed—to be positively connected, but so as to be free and capable of being displaced in the direction of displacement of the holding body—on a clamping plate which also serves to connect the respective wedge member for the other clamping jaw and its respective drive piston.

In accordance with another preferred embodiment, the head is further equipped with a movable guide jaw, and its adjustment movements occur generally in the direction transverse to the displacement or direction or movement of the head. This movable guide jaw is also comprised of an inner part which is guided in the holding body, and an outer part which is guided in the base with its wedge member and a drive piston which actuates the guide jaw. The outer and inner parts are operatively connected to one another in a linear guide means which provides a positive connection through an undercut or similar dovetail slide formation, and which extends parallel to the direction of displacement of the holding body.

It is also preferred that a respective outer part, when viewed in the direction of displacement of the head, is at least wider than the corresponding inner part, wider by an amount equivalent to the displacement of the head. It is then also preferred to permit that the inner part can enter into respective guide openings or recesses for the outer parts when the chuck is open.

In accordance with yet another preferred embodiment, the holding body can be adjusted in its guide by means of a control spindle which is journaled at the base and which can be controlled for adjustment purposes so as to be precluded to shift in axial direction and is held without undue play or clearance. The spindle, however, can run in or with respect to a spindle nut which is positioned so as to have no axial play and to be precluded to rotate in the holding body. The spindle nut is divided in a diametral plane into two halves, and the halves can be radially clamped together on the control spindle by means of a control sleeve which surrounds the spindle nut, applies a force in axial direction, and is actuated by way of a pressure medium.

When the spindle nut is loose, exteriorly induced turning of the control spindle will adjust or vary the position of the head until it has reached the desired position. Closing of the control sleeve causes pressing together of the spindle nut halves on the control spindle and the clearance between the screw thread flights of the control spindle and the spindle nut is removed. It is then preferred that the respective screw thread formations of the control spindle and in the spindle nut are trapezoidal.

It is also preferred that the two spindle nut halves be journaled at their respective ends by way of ball-bearing balls or the like elements which allow radial movements for operative contact at the holding body by the spindle nut components. The halves are formed with radial grooves into which fixing formations can enter between the balls. The fixing formations or elements are positively secured to the holding body and can preclude rotation of the spindle nut halves.

In addition to the clamping of the spindle nut on the control spindle, the guide means for the holding body in the base can be in the form of a dovetail slide. Distance-bridging wedge members or spacer bars are arranged at the inclined surfaces of the dovetail formations. These spacer bars can be actuated for operation by way of pressure-medium actuated clamping bars, to be clamped between the base and the holding body, but transverse to the holding body's displacement direction. This embodiment will result in reaction-free clamping of the holding body, i.e. free of repercussions with respect to the accuracy of the position for the head as achieved by the control spindle.

The transmission for the transfer of motive power between the holding body and the counterbalancing weights can include a gear wheel which is journaled in axis-parallel manner with respect to the respective axis of rotation in the base. A respective gear wheel is then adapted to engage in gear teeth racks provided at the holding body and at the counterbalancing weights, with the gear teeth racks extending in the direction of displacement of the holding body.

In order to prevent a swinging-out of the counterbalancing weights, clamping discs can be actuated by a pressure medium. These clamping discs can axially locate and fix the counterbalancing weights in their respective guides in the base, with a corresponding frictional contact. The clamping discs and the spacer bars or shims can be actuated by way of a common pressure medium system or conduits. However, separate pressure-medium control is required for the clamping or control sleeve on the other hand.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
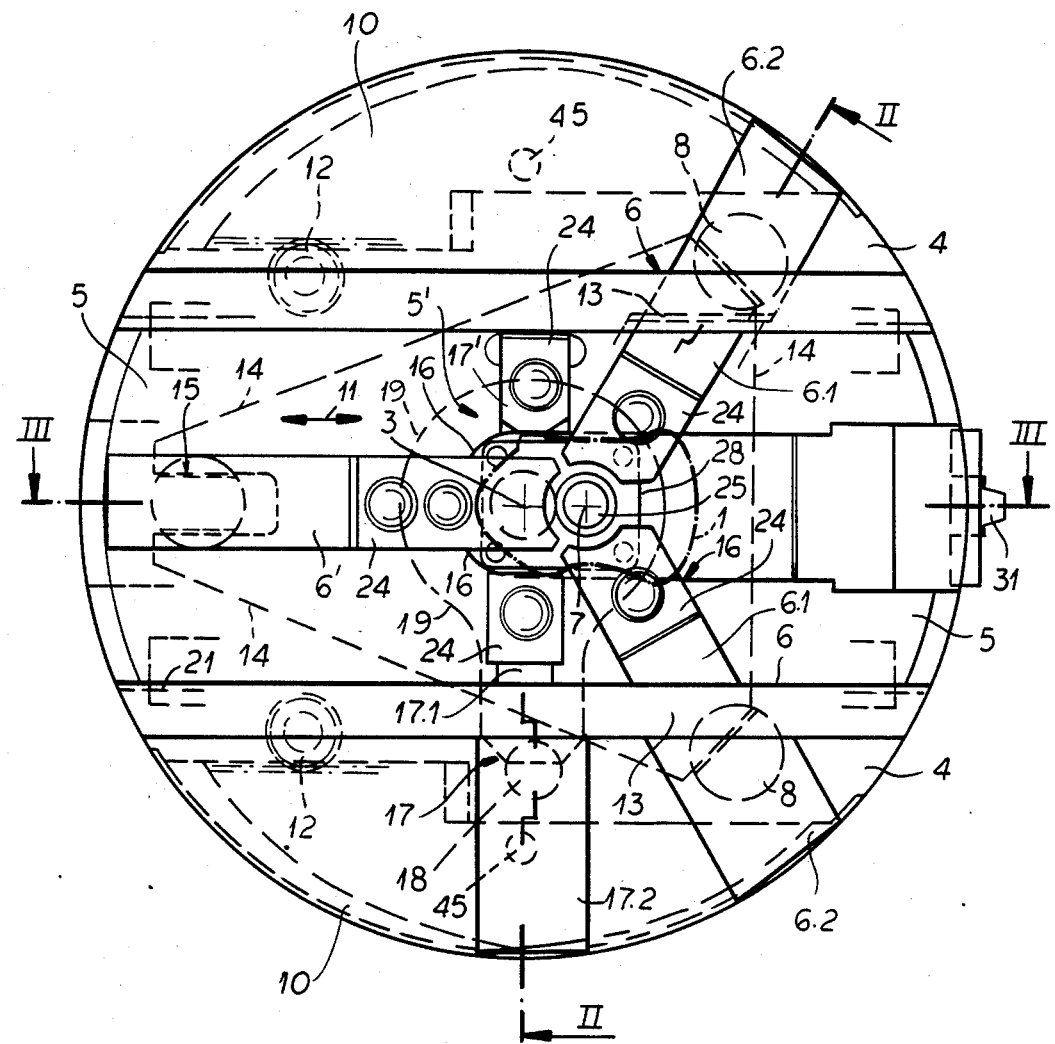
FIG. 1 is an end view of the power chuck apparatus viewed at the forward side thereof.

The power chuck, or power chuck apparatus, serves to clamp workpieces in an eccentric manner, for example, crankshafts of which one is shown in broken lines in end view at 1 in FIG. 1. The crankshaft is clamped in place as is indicated, respectively, in FIGS. 2 and 3 by the reference numerals 2' and 2".

The chuck is generally comprised of a base 4 which is adapted to be secured at the spindle of a lathe, or similar tool machine, having an axis of rotation 3. As best seen in FIG. 1, the chuck also generally comprises a head 5', two inclined clamping jaws 6, and a horizontally disposed clamping jaw 6'. The three clamping jaws are radially guided with respect to a clamping axis 7 which extends parallel to the axis of rotation 3.

The clamping jaws 6 and 6' are connected, by way of axially movable wedge members 8 and 8', e.g. rods, to an annular drive piston 9 (FIG. 2) which is mounted in the base 4 for longitudinal or axial movements.

The head 5' includes a holding body 5 which is guided so as to be movable in the direction of the double headed arrow 11, also referred to as direction of displacement of holding body 5 hereinafter, transversely with respect to the axis of rotation 3, and parallel to that plane which passes through the axis of rotation 3 and the clamping axis 7. With reference to FIG. 1, this plane is the horizontal diametral plane of the power chuck. Thus, the body 5 is moved with respect to the base 4.

Adjustable counterbalancing or compensating weights 10 are provided, and these can be adjusted in the same direction as the holding body 5. The compensating weights, or elements, serve to compensate the out-of-round movements which are caused by shifting of the head 5'. The shifting of the head 5' is a function of the magnitude of the eccentricity distance, or lift of the crank of the crankshaft that is worked on.

In this embodiment, the head 5' can be shifted, with reference to the clamping axis 7, within a range of eccentricity of 25 to 50 mm with respect to the axis of rotation 3 of the base 4, and crankshafts having a lift or crank-stroke of 50 to 100 mm can be machined or treated.

The holding body 5 is formed as a slide which has a width, when considered in the transverse plane with respect to the direction of displacement 11, which is less than the diameter of the base 4. Accordingly, a compensating weight 10 can be mounted on each side i.e. upper and lower sides in FIG. 1, of the holding body 5 because sufficient room is provided there. Each compensating weight 10 is guided parallel with respect to the body 5 at the base 4. The compensating weights 10 are each connected, by a gear wheel 12, to act in countercurrent or counter-directed manner, such that a shifting of the holding body 5 results automatically in a corresponding countercurrent shifting of the compensating weight 10 to preclude undue imbalances.

The two inclined clamping jaws 6, the direction of guidance of which with respect to the holding body 5 is inclined with respect to the horizontal axis or plane, are respectively divided into an inner part 6.1 and an outer part 6.2. Each inner part 6.1 is only guided in the body 5, whereas each outer part 6.2 and the associated wedge member 8 connected to it are only guided in the base 4.

Both parts 6.1 and 6.2 are connected to be positively secured in a linear guide means with dovetail formations, or of dovetail construction when considered in transverse cross section. Each linear guide means is generally identified by reference numeral 13 (FIG. 2), and extends parallel in the direction of displacement 11 of the holding body 5. This means—when the holding body 5 is moved—an inner clamping jaw part 6.1 can correspondingly move with respect to the associated outer clamping jaw part 6.2, but the positive connection of both parts 6.1 and 6.2 is maintained by the linear guide means 13. On the other hand, each displacement or adjustment of the outer part 6.2 results in a corresponding movement or adjustment of the inner part 6.1 and this occurs independently of a respective position of the holding body 5.

The horizontal clamping jaw 6' is guided parallel with respect to the direction of displacement 11 of the holding body 5 and does not comprise a separation as descried in conjunction for the other two, inclined, clamping jaws 6. The clamping jaw 6' is of unitary structure, or includes combined inner and outer clamping jaw components or parts 6.1 and 6.2.

The clamping jaw 6' is guided with its wedge member 8' only in the holding body 5. The wedge member 8' is axially and positively connected by being hung, or similarly engaged, at position 15 at a clamping plate 14 which also connects the wedge members 8 for the other two clamping jaws 6 to the drive piston 9. On the other hand, the wedge member 8' can be shifted in the direction of displacement 11 of the holding body 5. The wedge member 8' can participate, with reference to the clamping plate 14, in the motion of the head 5'. The clamping plate 14 is unitarily connected to or formed with the driving piston 9.

A recess 16 (FIG. 3) can receive the end of a respective crankshaft at the holding body 5. The recess 16 merges radially in the direction of the rim of the chuck in the direction of displacement 11 of the head 5'.

Transverse with respect thereto and on both sides of the recess 16, in the vicinity of the axis of rotation 3, there are provided movable guide jaws 17 and 17'. The upper guide jaw 17' is positively connected at the holding body 5, whereas the other, lower, guide jaw 17 is guided so as to be movable in transverse direction with respect to the direction of displacement 11 of the head 5'.

Again, the movable guide jaw 17 is divided into a first part which is only guided in the holding body 5, i.e., an inner jaw part 17.1, and it is also divided into an outer part 17.2. The outer part 17.2 and its respective wedge member 18, as well as the drive piston 20 which serves to actuate the guide jaw 17, are guided in the base 4. They are also connected to the inner jaw part 17.1. This connection is achieved by a dovetail-shaped linear guide means 21 so as to provide a positively locked relationship. The linear guide means 21 also extends parallel to the direction of displacement 11 of the holding body 5.

Accordingly, also in this case the inner guide jaw part 17.1 can participate in the shifting of the head 5' while being maintained in positively connected manner, in its own guiding direction, at the outer guide jaw part 17.2. Also in this case—as in the corresponding situation of the other jaws 6—the inner movable guide jaw part 17.1 participates independently of the respective position of the holding body 5 in the movements of the outer movable guide jaw part 17.2.

The connection between the wedge member 18 and the drive piston 20 is carried out by way of a clamping plate or element 19. A corresponding wedge member 18 is axially connected at 22 (FIG. 2) to the element 19, by being hung in place. However, the wedge member or rod 18 is also adapted to be moved in the direction of displacement 11 of the head 5'. In this embodiment, again, the clamping plate or element 19 is formed unitarily with the drive piston 20.

In further detail, the outer clamping jaw parts 6.2 or 17.2, when viewed in the direction of displacement 11 of the head 5', are at least wider than the respective inner clamping jaw parts 6.1 and 17.1 by the displacement stroke or lift distance of the head 5'. The respective inner clamping jaw parts 6.1 and 17.1 can enter into the guide recesses for the outer jaw parts at the base 4 during opening of the chuck, i.e., on radial retraction of the outer jaw parts 6.2 and 17.2. This applies to the entire possible distance of the adjustment stroke or movement of the head 5'.

The corresponding guide gaps or recesses between the holding body 5 and the base 4 are covered by cover strips 23 which are screwed to the base 4 at the frontal face thereof. These cover strips extend over the linear guide means 13 and 21 between the inner and outer jaw parts, and they provide a similar cover at the jaws 6 and at the movable guide jaw 17.

All jaws, i.e., clamping jaws and guide jaws, which directly contact a respective workpiece, carry interchangeable and replaceable adjustment elements 24 which are adapted to retain a specific workpiece by being correspondingly positioned and shaped for a specific workpiece.

A centering tip 25 is provided at the holding body 5, and the tip 25 is coaxially aligned with the clamping axis 7. The centering tip 25 is axially guided, against the pressure of a spring 26 (FIG. 3), in a sleeve 27 at the holding body 5. The sleeve 27 also serves, by means of a flange 28 as the limit of the longitudinal movement of the workpiece. This provides the opportunity to retract the centering tip 25 by way of a pin 29 and with the aid of the clamping plate or element 19, with the latter being also provided for the guide jaw 17.

The two drive pistons 9 and 20, for the guide jaws 17, 17', or the clamping jaws 6, 6', respectively, are formed as annular pistons and extend coaxially and concentrically with respect to one another. They are actuated by clamping anchors, not shown in the drawing, which are guided in the spindle of the respective machine.

The position of the holding body 5 can be adjusted in its slide guide by means of a control spindle 31 (FIG. 2) which is axially arranged and journaled at a position designated by reference numeral 30 (FIG. 3) at the base 4 to be precluded to move and without clearance or tolerance.

Figure 6:
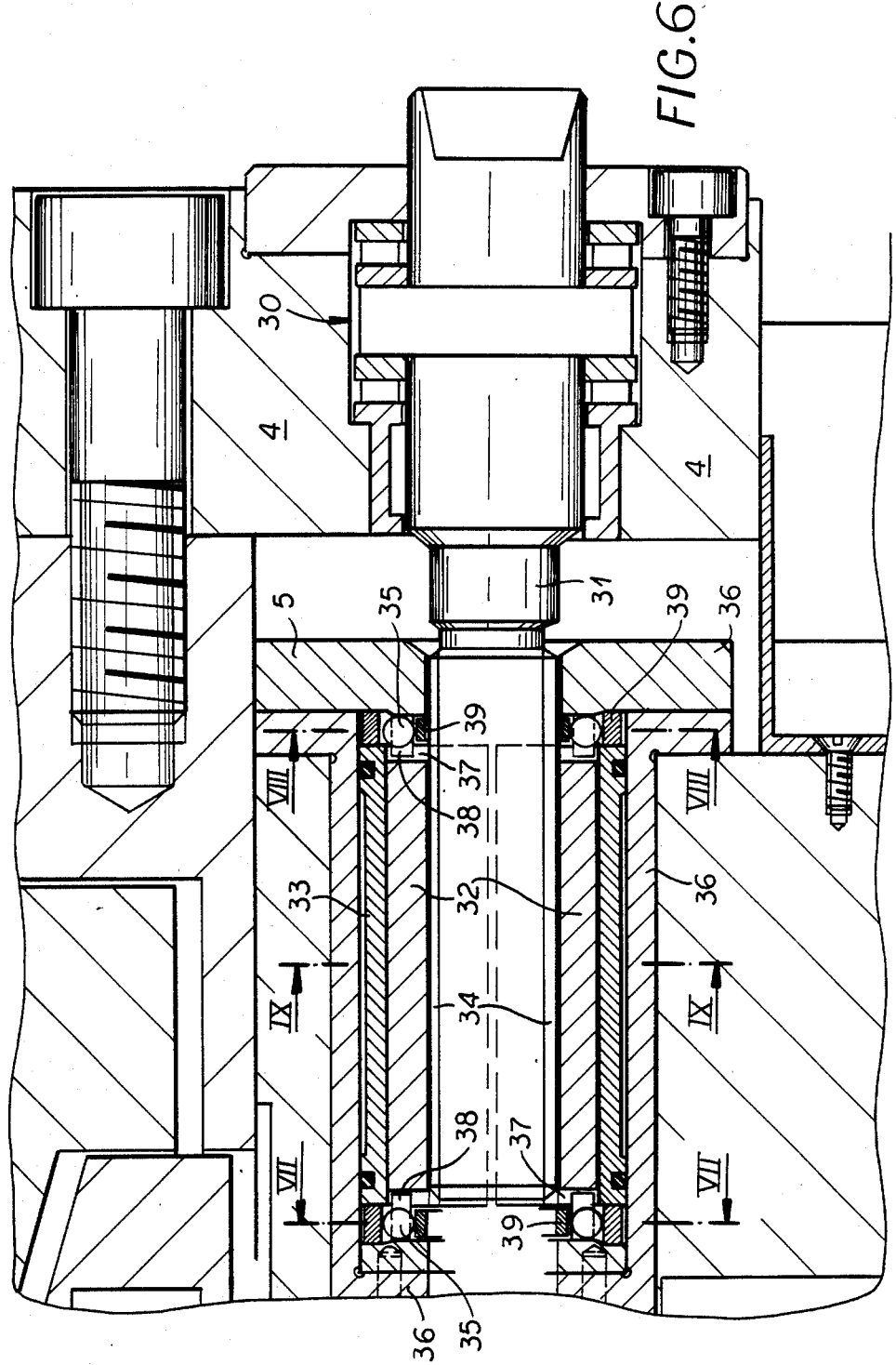
FIG. 6 is an enlarged detail showing the control spindle for the head in the detail of FIG. 3, but drawn to a larger scale.
Figure 7:
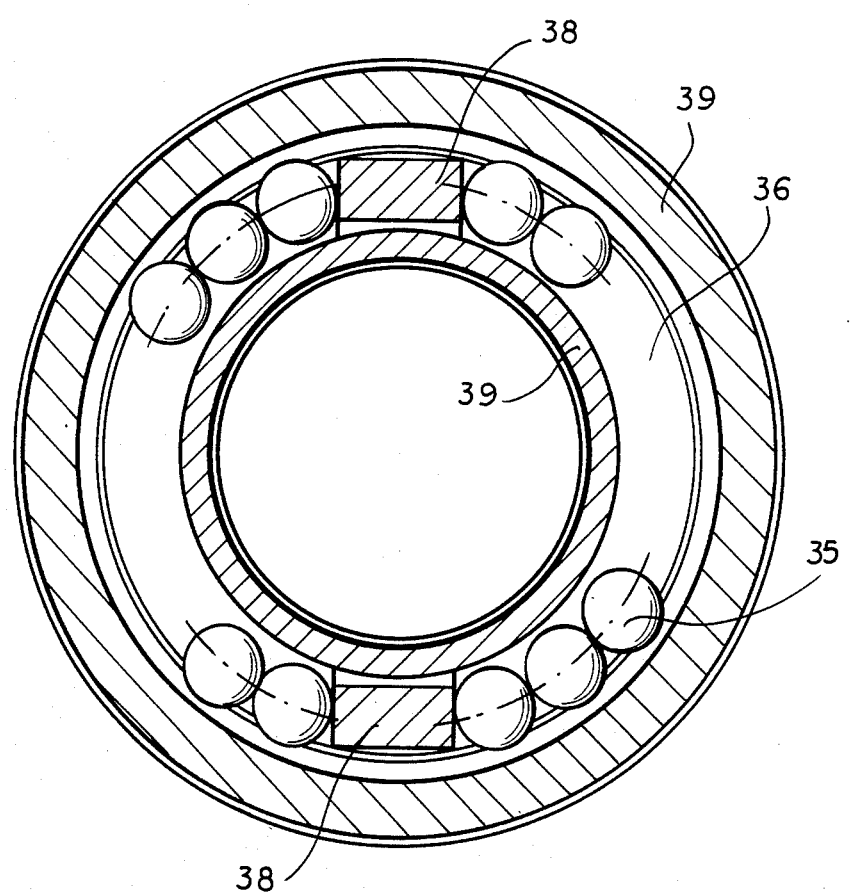
FIG. 7 is a cross section along line VII—VII in FIG. 6.
Figure 8:
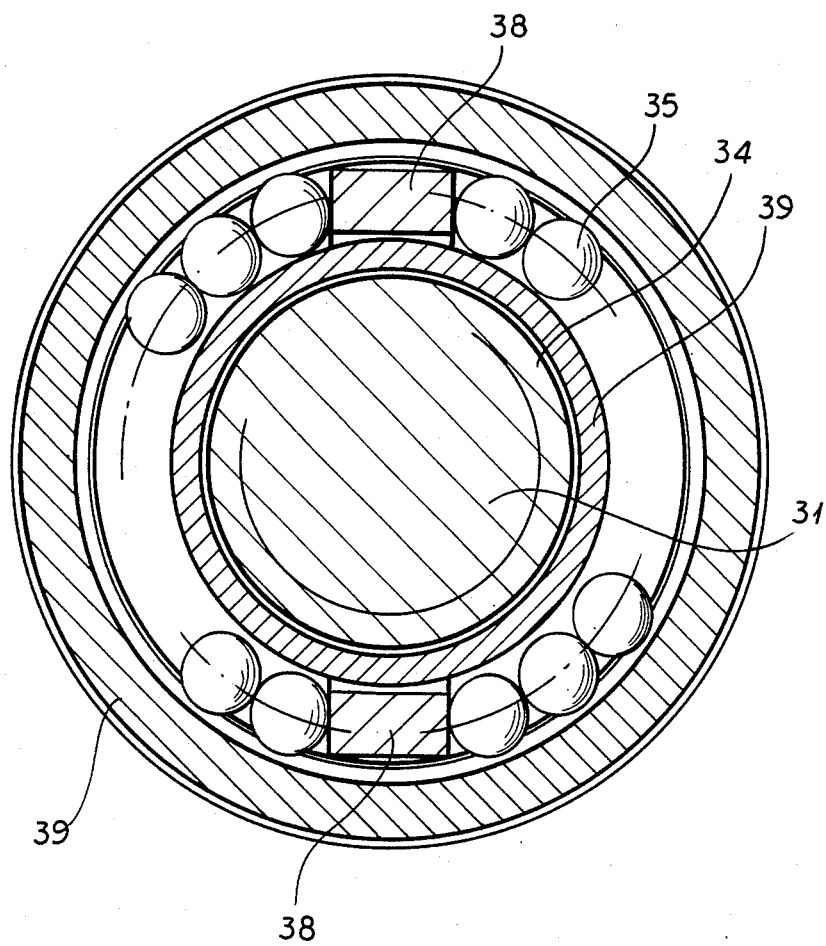
FIG. 8 is a further cross section alone line VIII—VIII in FIG. 6.
Figure 9:
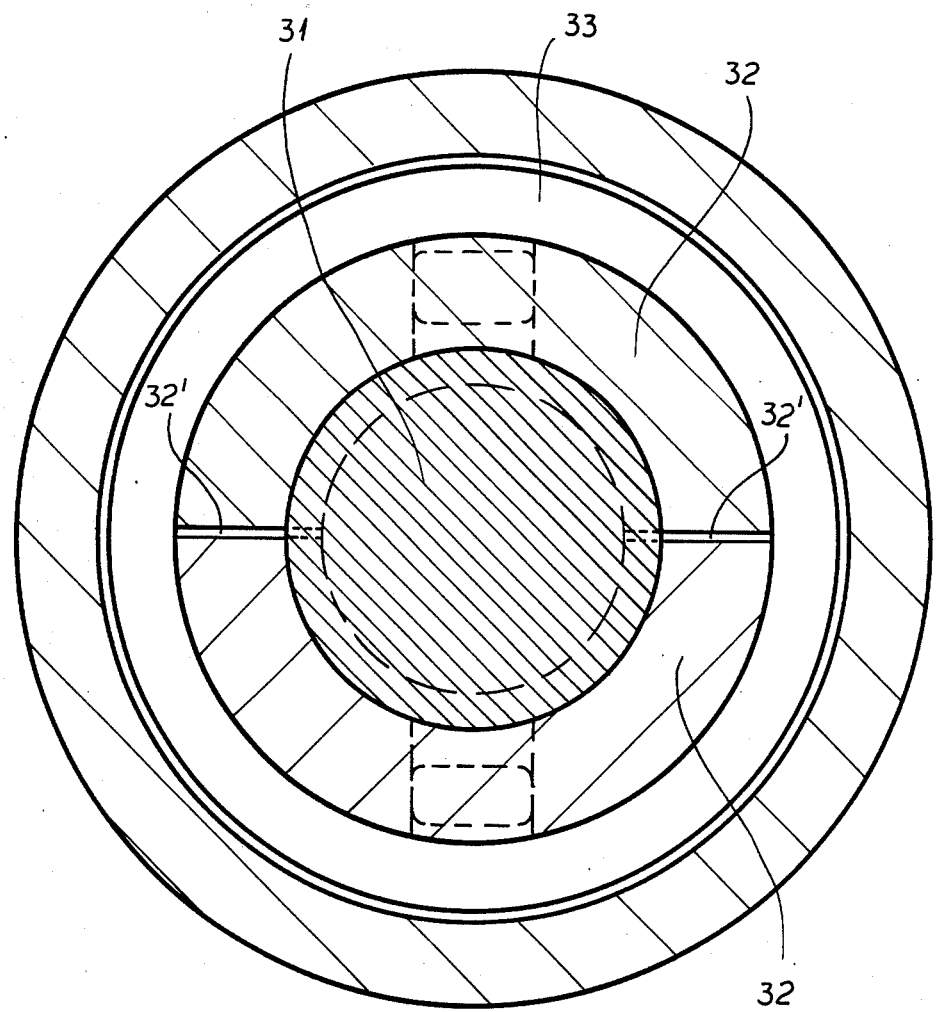
FIG. 9 is a cross section along line IX—IX also in FIG. 6.

With reference to FIG. 6, the control spindle 31 is operated from the outside of the chuck, and it runs in a spindle nut 32 which is also axially arranged, but without clearance or free play, in the holding body 5. The spindle nut 32 is also mounted so as to be precluded to rotate. The spindle nut 32 is divided into two parts or halves by way of slots 32' (FIG. 9) in the diametral plane, and these halves can be pressed together on the control spindle 31 by means of a control sleeve 33 which is hydraulically actuated. The control sleeve 33 surrounds the spindle nut 32, and when hydraulic pressure is applied, it radially exerts pressure on the spindle nut halves to press them together for removal of any clearance or free movement between the flights of the screw threads of the spindle 31 and of the spindle nut 32.

The respective screw threads, generally identified by reference numeral 34, of the control spindle 31 and of the spindle nut 32 are trapezoidal when viewed in cross section.

The two parts of the spindle nut 32 can frontally contact the holding body 5, or an annular flange 36 connected thereat, and a cover 36', with their respective sides or ends, by way of balls 35, which allow the just described radial freedom or breathing space of the spindle nut parts.

The two halves of the spindle nut 32 are formed with radial grooves 37 in their frontal sides or end faces, into which can extend fixing formations, fingers or similar elements 38 which are respectively arranged at the holding body 5, at the annular flange 36, or at the cover 36'. These elements 38 can extend between the balls 35, and they can achieve an effective securement against rotation. The balls 35 effect the axially support, without play or clearance, of the spindle nut 32 in the holding body 5, and they are held between inner and outer race rings 39.

Figure 5:
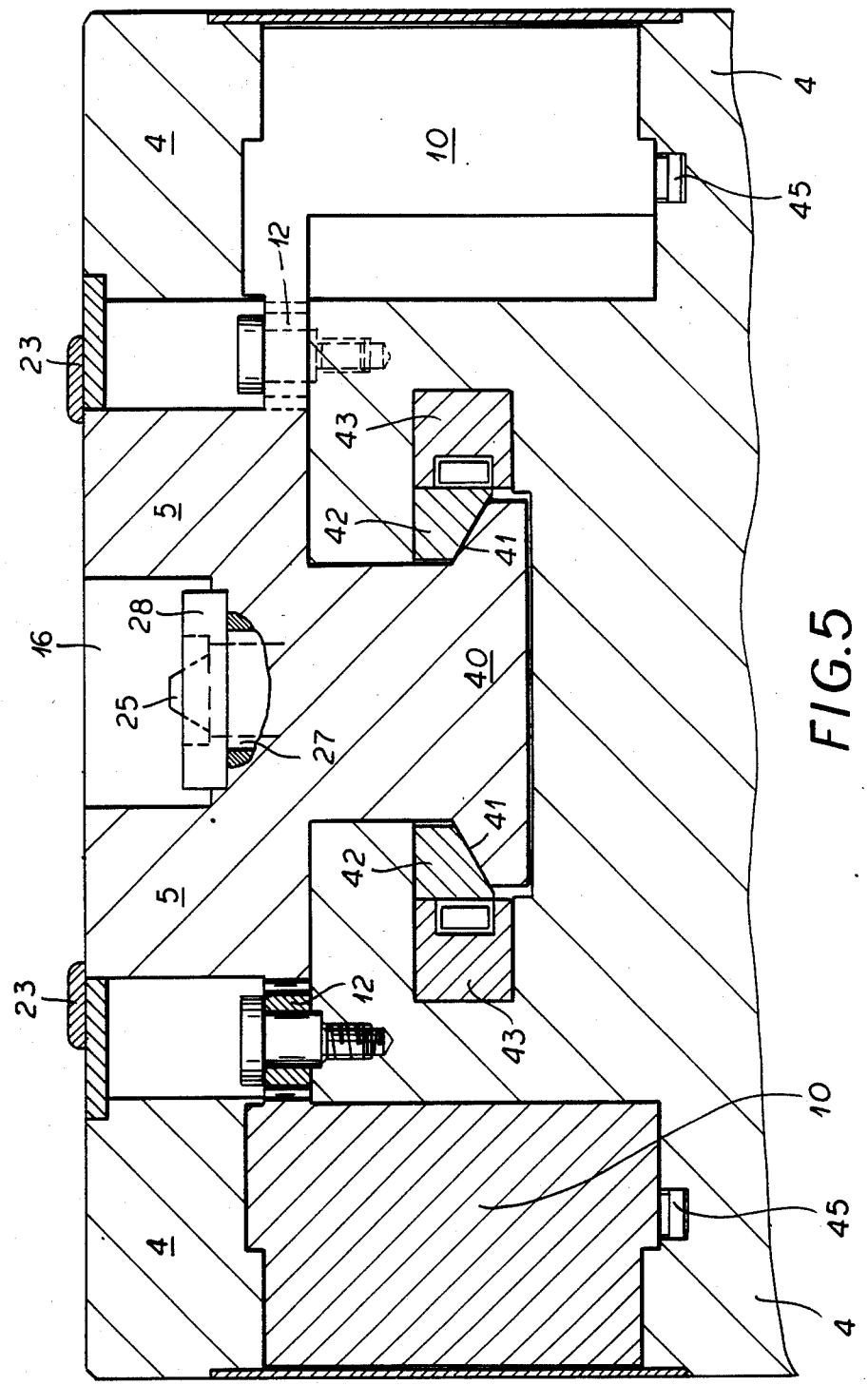
FIG. 5 is a cross section along line V—V in FIG. 4.

With reference to FIG. 5, the guiding of the holding body 5, as a slide, in the base 4 is generally by way of a dovetail guide. At both inclined surfaces 41 of the dovetail formation 40 there are provided distance-bridging spacer bars 42 or shims having a wedge-like cross section. The spacer bars or shims 42 can be clamped with the aid of hydraulically actuated clamping bars 43 between the base 4 and the holding body 5, but transverse to the direction of displacement 11 of the latter, and this will be done without reaction so that the positioning accuracy achieved by the control spindle 31 is not hampered by the respective positioning or fixing of the position of the holding body 5.

Figure 4:
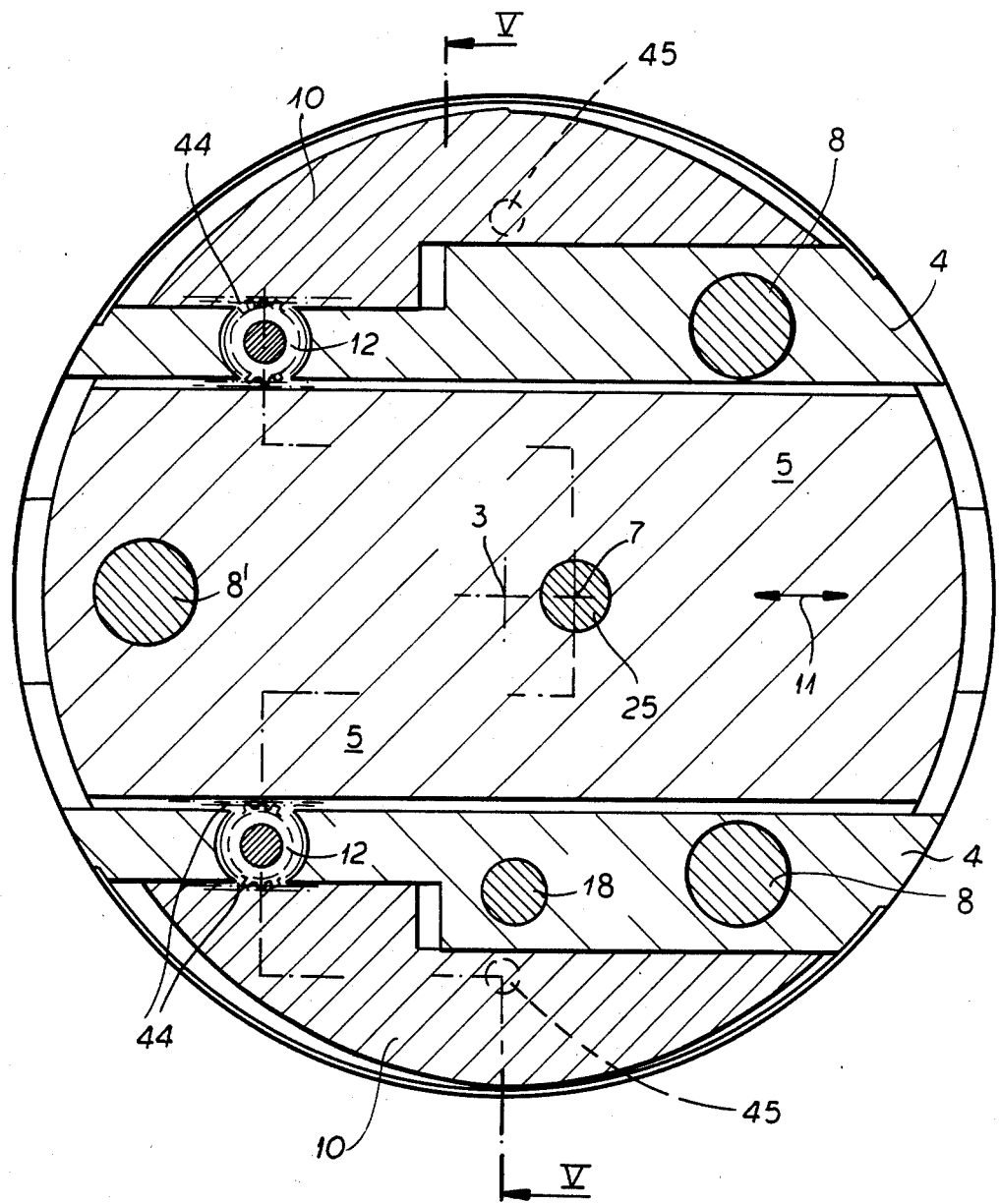
FIG. 4 is a cross section along line IV—IV in FIG. 2.

The gear wheels 12 between the holding body 5 and a respective compensating weight 10 are journaled in the base 4 in an axis-parallel attitude with respect to the axis of rotation 3. Each gear wheel 12, on the one hand, is in engagement at the holding body 5 and, on the other hand, at a respective compensating weight 10 by means of gear racks 44 (FIG. 4) which extend in the direction of displacement 11. The movement of the holding body 5 in one direction leads to shifting of the respective compensating weight 10 in the opposite direction, i.e. countercurrent, counter-directed or counter-acting motions occur.

The compensating weights 10 are dimensioned in such a way that the mass redistribution—which occurs due to shifting of the holding body 5, and inclusive of the mass of the workpiece—can be substantially completely compensated. The inherently remaining imbalance is taken up by the spindle of the lathe or the journals thereof.

Figure 2:
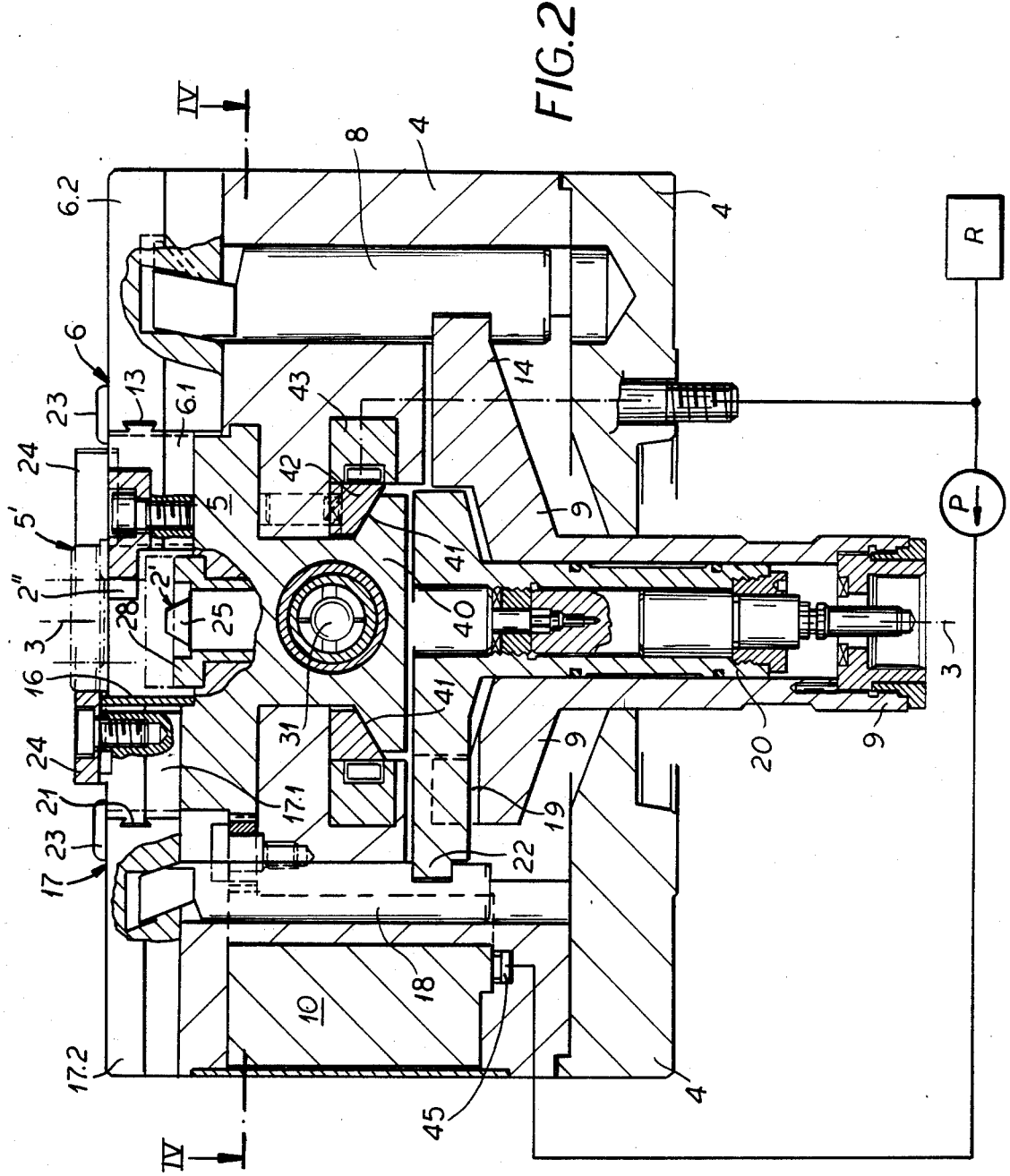
FIG. 2 is a cross section alone line II—II in FIG. 1.
Figure 3:
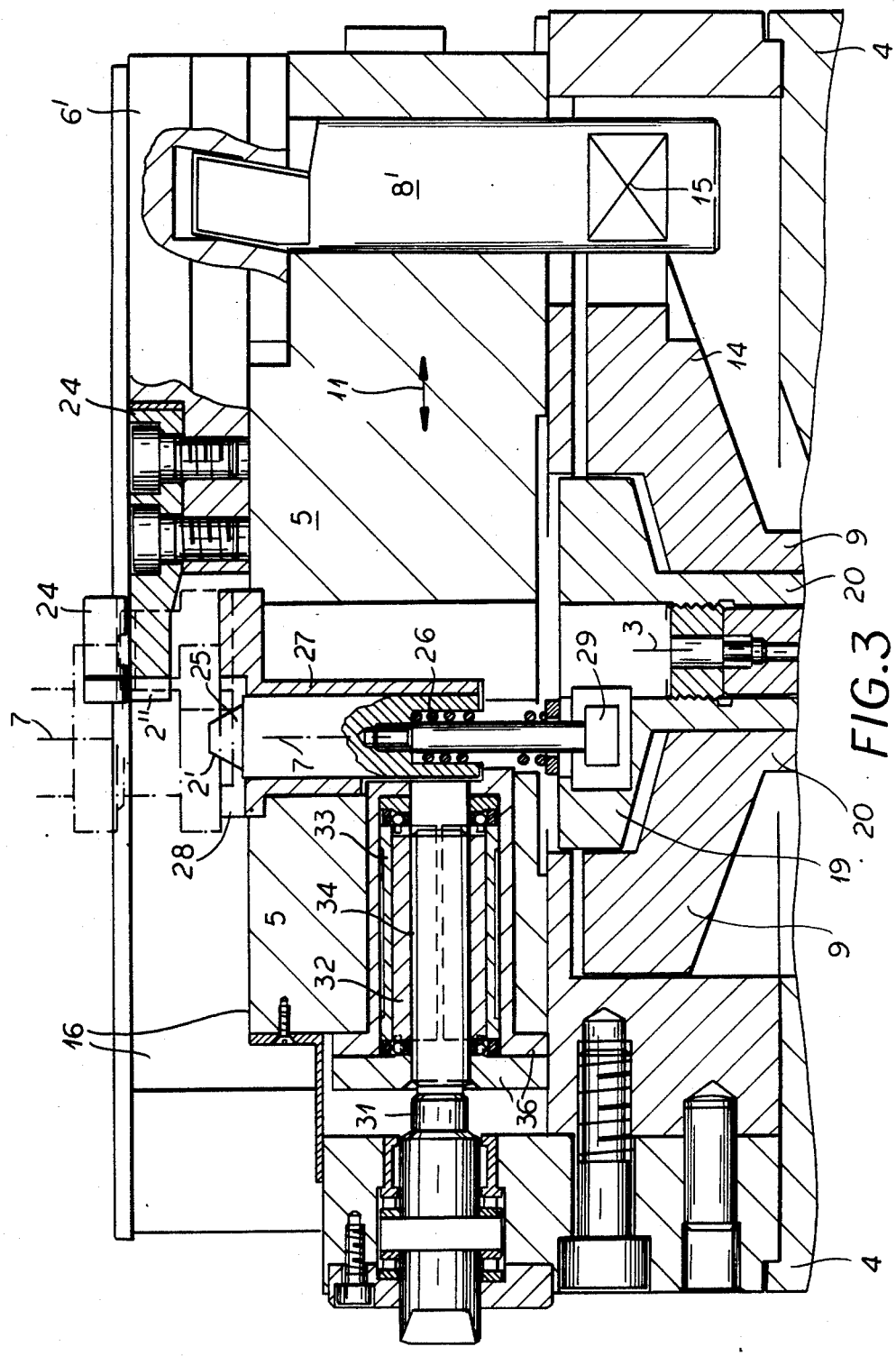
FIG. 3 is a further cross section along line III—III in FIG. 1.

Swinging out of the compensating weights 10 is prevented by their stable guiding in respective guide means in the base 4 and by hydraulically actuated clamping discs 45 (FIG. 2). These clamping disc 45 can secure the weights 10, generally axially, against the base 4 and retain them or clamp them in their guides with frictional contact or seating. The hydraulic pressure for these clamping discs 45 is taken from the same conduit which supplies the clamping or spacer bars 42. However, the spacer bars 42 and the clamping discs 45, on the one hand, and the control sleeve 32, on the other hand, can be independently controlled of one another by way of hydraulic conduits.

The outer clamping jaw parts 6.2 of the clamping jaw 6 can be actuated to carry out a rapid or accelerated lift in addition to its regular clamping lift. In contrast, the undivided jaw 6' is only guided in the holding body 5, and it is generally capable of merely carrying out a respective clamping stroke or lift.

I claim:

1. A power-actuatable chuck for clamping a workpiece eccentrically with respect to a spindle axis, said chuck comprising:
   a base adapted to be coupled to a machine-tool spindle having a spindle axis for rotation about said spindle axis;
   a head secured to said base, said head including a holding body adapted to be moved with reference to a direction of displacement, and said holding body being adjustably guided at said base in a direction transverse to said spindle axis and parallel to a plane which passes through said spindle axis and a clamping axis parallel to but offset from said spindle axis;
   a drive piston in said base for axial displacement with respect thereto;
   movable clamping jaws operatively connected to said drive piston for securing a workpiece in the chuck along said clamping axis, said clamping jaws being mounted for radial movement in respective directions of displacement with respect to the direction of displacement of said holding body;
   axially movable wedge members for connecting said movable clamping jaws to said drive piston;
   mutually opposing counterbalancing elements which can move in the direction of displacement of said holding body, said counterbalancing elements being arranged and guided on said holding body at said base and connected to said holding body for movement in a counter-directed manner; and
   a transmission for connecting said counterbalancing elements and said holding body at least one of said clamping jaws comprised of:
   an inner part which is guided in said holding body;
   an outer part which is guided with a respective wedge member in said base; and
   means for operatively connecting said inner part and said outer part to one another, said means including a linear guide which is providing a positive connection through a dovetail slide formation and which extends parallel to the direction of displacement of said holding body.

2. The chuck defined in claim 1 wherein said holding body is a slide having a width which, when considered in the direction transverse to the direction of displacement thereof, is less than a diameter of said base.

3. The chuck as defined in claim 1 wherein said means for radially guiding said clamping jaws with respect to said clamping axis includes guide openings, and wherein a respective outer part, when viewed in the direction of displacement of said holding body, is at least wider by an amount equivalent to a displacement stroke of the holding body than an associated inner part, and the inner part when the chuck is in its open position enters into respective guide openings for the respective outer part.

4. A power-actuatable chuck for clamping a workpiece eccentrically with respect to a spindle axis, said chuck comprising:
   a base adapted to be coupled to a machine-tool spindle having a spindle axis for rotation about said spindle axis;
   a head secured to said base, said head including a holding body adapted to be moved with reference to a direction of displacement, and said holding body being adjustably guided at said base in a direction transverse to said spindle axis and parallel to a plane which passes through said spindle axis and a clamping axis parallel to but offset from said spindle axis;
   a drive piston in said base for axial displacement with respect thereto;
   movable clamping jaws operatively connected to said drive piston for securing a workpiece in the chuck along said clamping axis, said clamping jaws being mounted for radial movement in respective directions of displacement with respect to the direction of displacement of said holding body;
   axially movable wedge members for connecting said movable clamping jaws to said drive piston;
   mutually opposing counterbalancing elements which can move in the direction of displacement of said holding body, said counterbalancing elements being arranged and guided on said holding body at said base and connected to said holding body for movement in a counter-directed manner; and
   a transmission for connecting said counterbalancing elements and said holding body at least one of said clamping jaws being a unitary component which is movably guided with a respective wedge member in and with respect to the direction of displacement of said body, said chuck further comprising:
   a further clamping element for connecting the respective wedge member of said unitary component and said drive piston in such a way that the respective wedge member is axially positively connected to, but so as to be free to be capable of being displaced in the direction of displacement of said holding, said clamping element.

5. The chuck as defined in claim 4 wherein said further clamping element also connects said drive piston to the respective wedge member for at least one other clamping jaw.

6. A power-actuatable chuck for clamping a workpiece eccentrically with respect to a spindle axis, said chuck comprising:

a base adapted to be coupled to a machine-tool spindle having a spindle axis for rotation about said spindle axis;

a head secured to said base, said head including a holding body adapted to be moved with reference to a direction of displacement, and said holding body being adjustably guided at said base in a direction transverse to said spindle axis and a clamping axis parallel to but offset from said spindle axis;

a drive piston in said base for axial displacement with respect thereto;

movable clamping jaws operatively connected to said drive piston for securing a workpiece in the chuck along said clamping axis, said clamping jaws being mounted for radial movement in respective directions of displacement with respect to the direction of displacement of said holding body;

axially movable wedge members for connecting said movable clamping jaws to said drive piston;

mutually opposing counterbalancing elements which can move in the direction of displacement of said holding body, said counterbalancing elements being arranged and guided on said holding bofdy at said base and connected to said holding body for movement in a counter-directed manner; and a transmission for connecting said counterbalancing elements and said holding body, said chuck further comprising:

a movable guide jaw operatively connected at said head; said movable guide jaw including:
 an inner part guided in said holding body, and
 an outer part guided in said base;

a drive piston for actuation of said movable guide jaw and connected thereto;

a wedge member for connecting said outer part and said drive piston;

wherein said wedge member connected to said outer part and said drive piston are also guided in said bases; and means for opeatively connecting said outer part and said inner part to one another, said means including a linear guide which is providing a positive connection through a dovetail slide formation and which extends parallel to the direction of displacement of said holding body.

7. A power-actuatable chuck for clamping a workpiece eccentrically with respect to a spindle axis, said chuck comprising:

a base adapted to be coupled to a machine-tool spindle having a spindle axis for rotation about said spindle axis;

a head secured to said base, said head including a holding body adapted to be moved with reference to a direction of displacement, and said holding body being adjustably guided at said base in a direction transverse to said spindle axis and parallel to a plane which passes through said spindle axis and a clamping axis parallel to but offset from said spindle axis;

a drive piston in said base for axial displacement with respect thereto;

movable clamping jaws operatively connected to said drive piston for securing a workpiece in the chuck along said clamping axis, said clamping jaws being mounted for radial movement in respective directions of displacement with respect to the direction of displacement of said holding body;

axially movable wedge members for connecting said movable clamping jaws to said drive piston;

mutually opposing counterbalancing elements which can move in the direction of displacement of said holding body, said counterbalancing elements being arranged and guided on said holding body at said base and connected to said holding body for movement in a counter-directed manner; and a transmission for connecting said counterbalancing elements and said holding body, said chuck further comprising:

a control spindle which is guided so as to be precluded to shift in an axial direction and without play or clearance in said base, whereby said holding body can be adjusted in its means for adjustably guiding it at said base;

a spindle nut adapted to support at least a portion of said spindle, said spindle nut being positioned without axial play and to be precluded to rotate in said holding body, and said spindle nut including two separate halves separated at a diametral plane;

a control sleeve surrounding said spindle nut and adapted to bring the spindle halves into operative engagement; and pressure medium control means for actuating said control sleeve for engagement of said spindle nut halves.

8. The chuck as defined in claim 7 wherein said spindle nut halves include radial groove formations, said chuck further comprising:

ball-bearing type thrust absorbing means disposed between respective ends of said spindle nut halves and said holding body; and fixing formations at said holding body, said fixing formations being adapted to extend between respective balls into corresponding radial groove formations.

9. The chuck as defined in claim 7 wherein said spindle nut and said control spindle have cooperating trapezoidal screw thead formations.

10. The chuck as defined in claim 7 wherein said means for adjustably guiding said holding body at said base is a dovetail slide having inclined surfaces, and further comprising:

distance-bridging spacer bars arranged at said inclined surfaces, and adapted to be clamped between said holding body and said base but transverse to the direction of displacement of said holding body;

clamping bars adapted to actuate said spacer bars; and pressure medium control means for actuating said clamping bars.

11. A power-actuatable chuck for clamping a workpiece eccentrically with respect to a spindle axis, said chuck comprising:

a base adapted to be coupled to a machine-tool spindle having a spindle axis for rotation about said spindle axis;

a head secured to said base, said head including a holding body adapted to be moved with reference to a direction of displacement, and said holding body being adjustably guided at said base in a direction transverse to said spindle axis and parallel to a plane which passes through said spindle axis and a clamping axis parallel to but offset from said spindle axis;

a drive piston in said base for axial displacement with respect thereto;

movable clamping jaws operatively connected to said drive piston for securing a workpiece in the chuck along said clamping axis, said clamping jaws being mounted for radial movement in respective directions of displacement with respect to the direction of displacement of said holding body;

axially movable wedge members for connecting said movable clamping jaws to said drive piston;

mutually opposing counterbalancing elements which can move in the direction of displacement of said holding body, said counterbalancing elements being arranged and guided on said holding body at said base and connected to said holding body for movement in a counter-directed manner; and a transmission for connecting said counterbalancing elements and said holding body, said transmission for connecting said holding body and said counterbalancing weights including at least one gear wheel journaled axis-parallel with reference to said axis of rotation in said base, said chuck further comprising:

respective gear teeth racks at said holding body and said counterbalancing weights extending in the direction of displacement of said holding body, wherein a respective gear wheel is adapted to operatively engage said holding body and a respective counterbalancing weight by means of the corresponding gear teeth rack.

12. A power-actuatable chuck for clamping a workpiece eccentrically with respect to a spindle axis, said chuck comprising:

a base adapted to be coupled to a machine-tool spindle having a spindle axis for rotation about said spindle axis;

a head secured to said base, said head including a holding body adapted to be moved with reference to a direction of displacement, and said holding body being adjustably guided at said base in a direction transverse to said spindle axis and parallel to a plane which passes through said spindle axis and a clamping axis parallel to but offset from said spindle axis;

a drive piston in said base for axial displacement with respect thereto;

movable clamping jaws operatively connected to said drive piston for securing a workpiece in the chuck along said clamping axis, said clamping jaws being mounted for radial movement in respective directions of displacement with respect to the direction of displacement of said holding body;

axially movable wedge members for connecting said movable clamping jaws to said drive piston;

mutually opposing counterbalancing elements which can move in the direction of displacement of said holding body, said counterbalancing elements being arranged and guided on said holding body at said base and connected to said holding body for movement in a counter-directed manner; and a transmission for connecting said counterbalancing elements and said holding body, said chuck further comprising:

clamping discs for securing said counterbalancing weights in respective guides at said base; and pressure medium control means for actuating said clamping discs.

13. In a chuck for workpieces which are to be clamped in eccentric manner, especially crankshafts, said chuck including:

a base adapted to be connected to a spindle of a lathe having an axis of rotation so as to extend coaxially with respect to said spindle, clamping jaws secured to a head, which are movably and radially guided with respect to a clamping axis which extends parallel to said axis of rotation of said spindle, axially movable wedge members for connecting said clamping jaws to a drive piston the position of which can be axially varied in said base, said head also having a holding body which is adjustably guided at said base in a direction transverse to said axis of rotation and parallel to a plane which passes through said axis of rotation and a respective clamping axis, counterbalancing elements which can move in a direction of displacement of said holding body, the improvement comprising:

said holding body is a slide having a width which, when considered in a direction transverse to a direction of displacement of said slide, is less than a diameter of said base, said counterbalancing elements are opposed and arranged and guided on said holding body at said base, a transmission for connecting, in a counter-directed manner to said holding body, respective counterbalancing elements, at least one of said clamping jaws can be moved respectively in a displacement direction which is inclined with respect to said holding body, is divided into an inner part and an outer part, with said inner part being guided in said holding body, and said outer part with the connected wedge member being guided in said base, and both parts are operatively connected to one another by way of a linear guide means providing a positive connection through a dovetail slide formation and which extends parallel to the direction of displacement of said holding body.

* * * * *